July 27, 1937.  E. G. LOOMIS  2,087,917
MIXING MACHINE
Filed Dec. 13, 1935   3 Sheets-Sheet 1

INVENTOR
EVARTS G. LOOMIS
BY
Harry Radzinsky
ATTORNEY

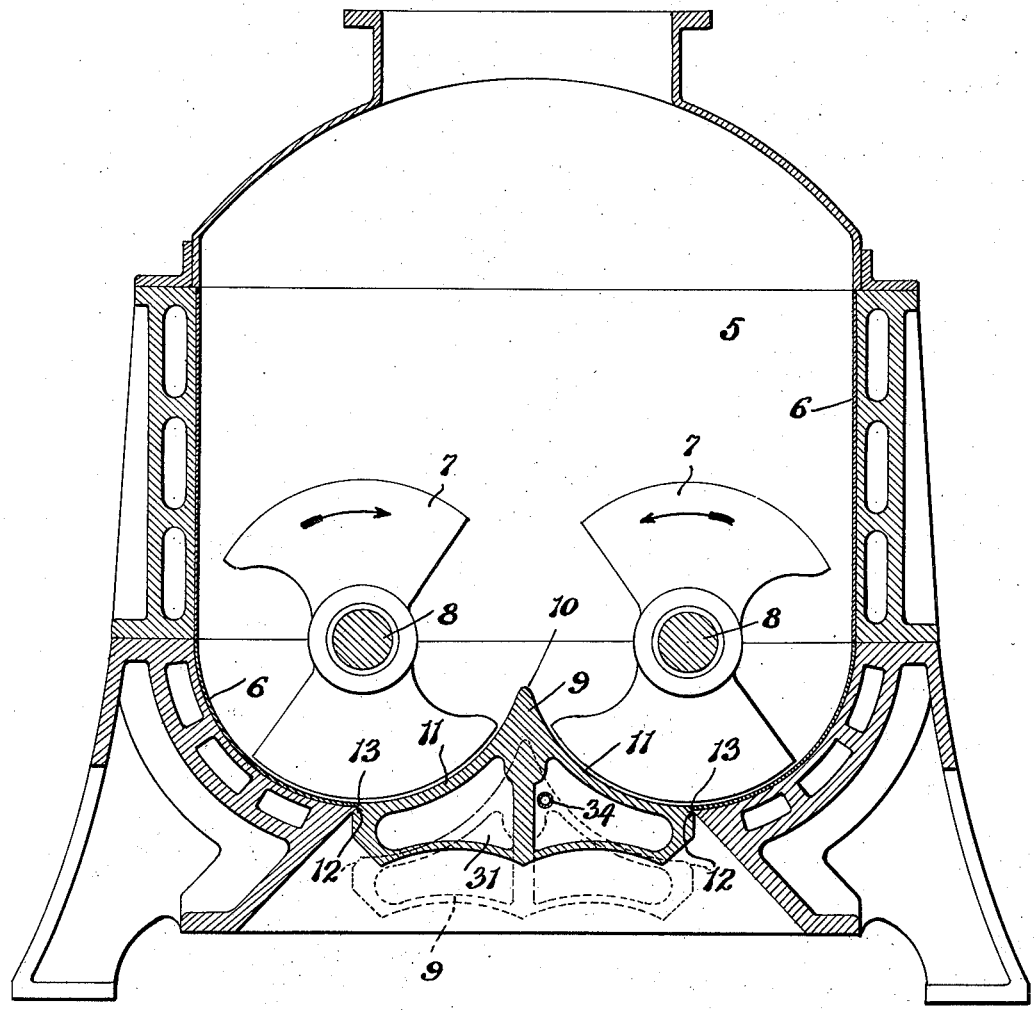

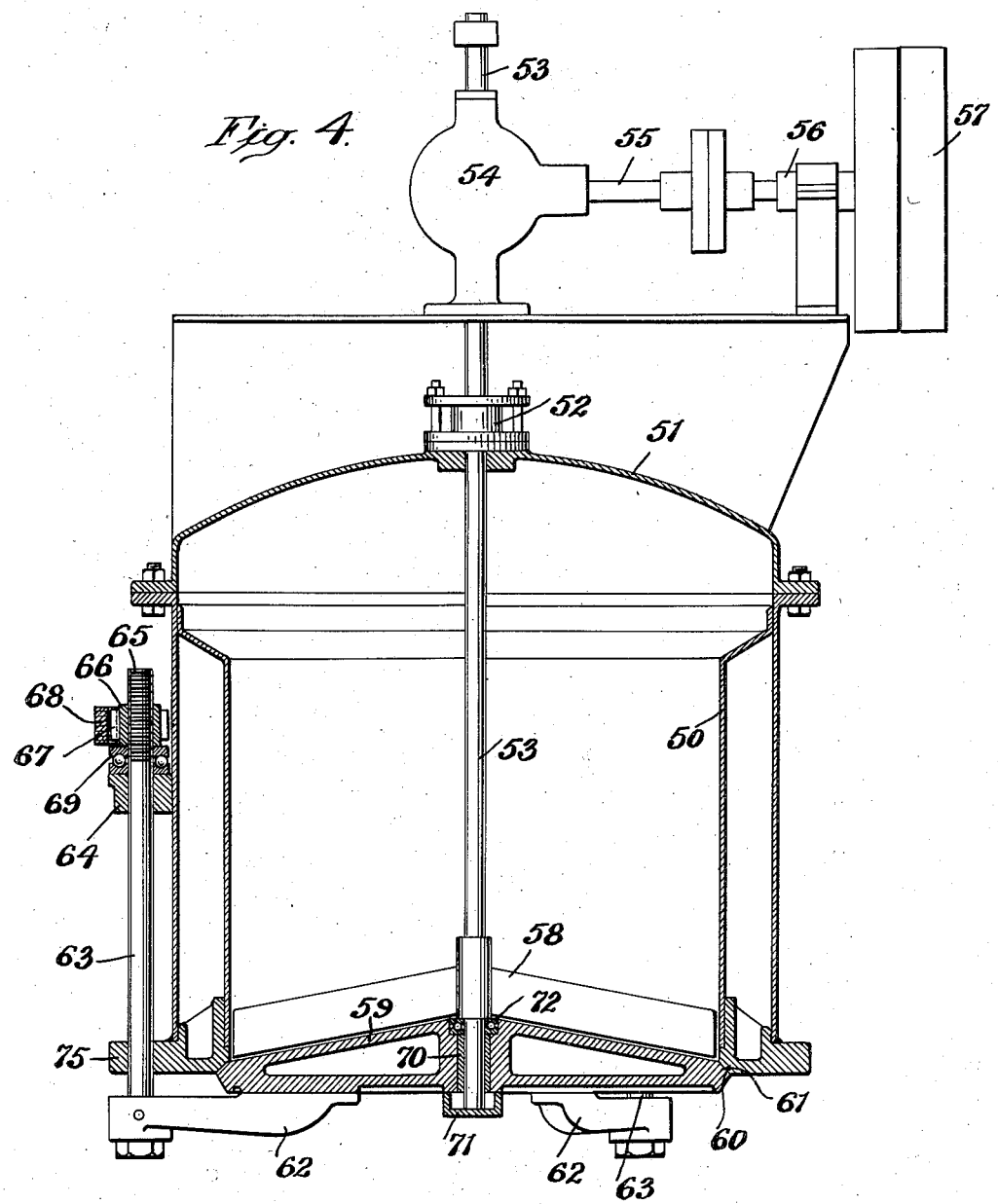

Patented July 27, 1937

2,087,917

UNITED STATES PATENT OFFICE 2,087,917

MIXING MACHINE

Evarts G. Loomis, Newark, N. J.

Application December 13, 1935, Serial No. 54,177

8 Claims. (Cl. 259—41)

This invention relates to an improvement in mixing, shredding, pulverizing or other similar machines and has for its object to provide an improved means for dumping or delivering the contents of the mixing chamber of machines of this character.

Heretofore it has been proposed to eject or deliver the contents of the machine after they have been mixed, shredded, pulverized or agitated, through either a movable bottom hinged below the mixing chamber, a sliding bottom, a circular hole with a valve connected to the bottom, or else by pivoting the trough so as to permit of it being tipped to pour or remove the contents out through its top. In some cases, these delivery arrangements were found satisfactory, but where an adhesive, semi-solid or gelatinous material was used, a great deal of the contents adhered to the side walls or remained in the receptacle and adhered to the upper surface of the bottom thereof, so that a complete evacuation of the contents was not easily had.

The object of my invention, therefore, is to provide in machines of this character, a means whereby a complete evacuation of the mixing chamber or trough of its contents can be easily had. I attain this desired result by providing a movable bottom on the mixing chamber which is uniformly moved away from the lower end of the trough by a vertical lowering movement so that any scraping contact of the bottom and parts of the trough with which it normally abuts, is avoided and the rotation of the mixing, shredding or agitating blades while the bottom is in its lowered position will force the contents of the mixing chamber directly out of the same.

Figure 1:
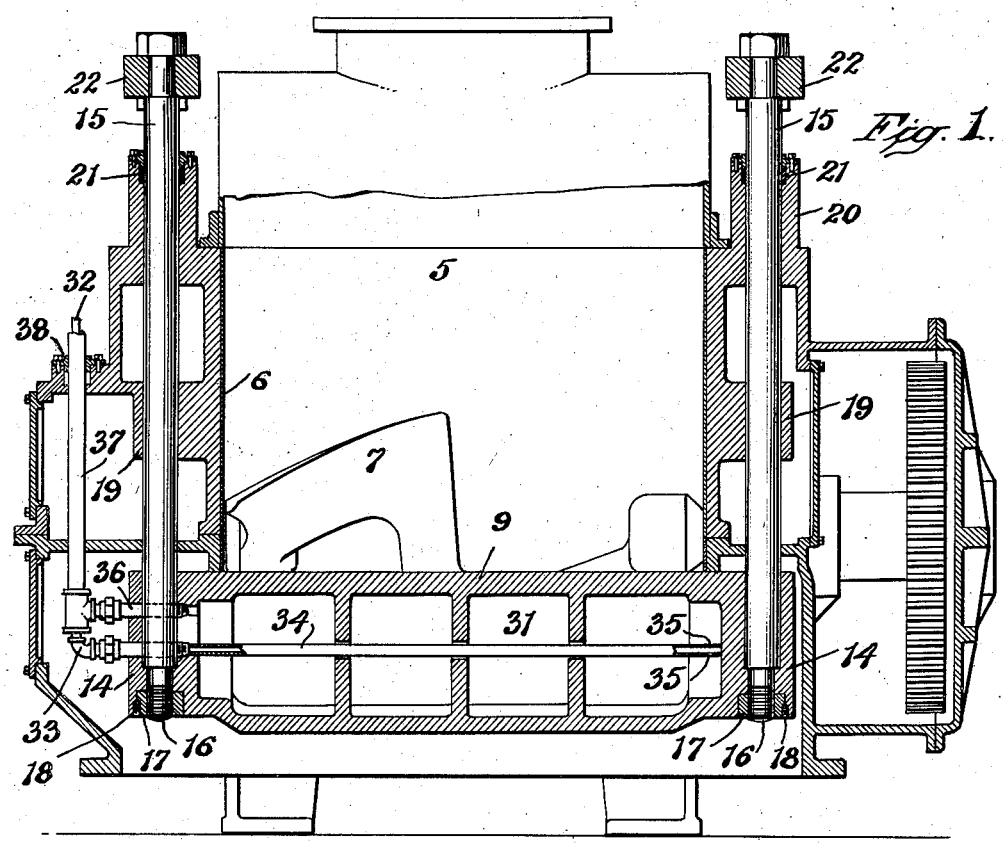
Figure 2:
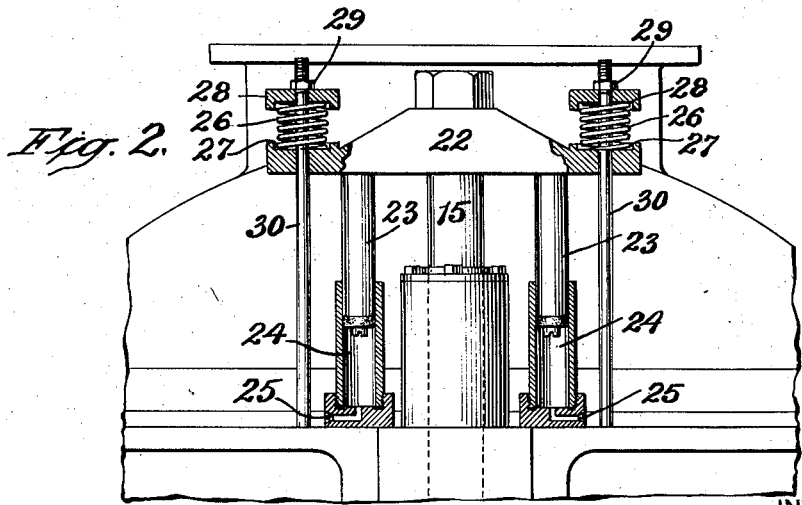

In the accompanying drawings wherein several embodiments of the invention are shown, Fig. 1 is a vertical sectional view through a mixing machine trough showing my improved movable bottom; Fig. 2 is an end view of a part of the machine showing a hydraulic means for raising the bottom and holding it in closed position; Fig. 3 is a sectional view through the machine of Fig. 1, taken at right angles thereto; and Fig. 4 is a sectional view of a type of vertical mixer showing my improved bottom applied thereto.

In the embodiment of the invention shown in Figs. 1 to 3 inclusive, I have shown portions of a mixing machine of the so-called horizontal type, having a trough or mixing chamber 5 provided with a lining 6 and within which a pair of mixing blades 7, mounted on the shafts 8, are rotated. The movable bottom which uncovers an opening through which the contents of the trough are delivered is shown at 9 and is of substantially rectangular outline, having a central raised portion forming a longitudinally extending ridge 10, and an upper face having the curved surfaces 11 which conform closely to the shape of the mixing blades 7, as clearly shown in Fig. 3. The movable bottom 9 is provided with a peripheral angular edge portion 12 which forms a seating surface, and when the bottom is in its raised or closed position, as shown in Fig. 3, this peripheral surface 12 abuts against the complementary seat 13 formed on the edge of the bottom opening of the trough, which the bottom 9 closes. As is clear from Fig. 3, the longitudinal edges or seating surfaces indicated at 13, are each located on a vertical line with the center of the shaft 8 directly above it so that the opening in the bottom of the trough is of such size as to prevent the possibility of any portion of the mixture, and particularly any of the liquid content thereof from lying in any portion of the bottom after the evacuation of the contents from the trough. At its opposite ends the bottom 9 is provided with projecting portions 14 each of which receives the lower end of a vertical shaft 15 having a threaded end 16 received in nut 17, locked in place in the bottom extension 14 by the screw 18. Each of the vertical shafts 15 extends through guides 19 and 20, the upper guide 20 having a packing 21.

Secured at the upper end of each of the shafts 15 is a cross-head 22 provided with downwardly extending piston members 23, movable in cylinders 24, the cylinders being connected to passages 25 leading to a source of hydraulic pressure. When hydraulic pressure is exerted in cylinders 24, pistons 23 will be elevated to raise the crosshead 22 and as long as the hydraulic pressure is maintained in the cylinders, the bottom 9 will be held in an elevated or closed position, as shown in full lines in Fig. 3. The bottom is held in such elevated or closed position during normal operation of the machine.

Springs 26 rest upon seats 27 provided on the cross-head 22, these springs having caps 28 resting on their upper ends, said caps being adapted to be brought against nuts 29 located at the upper ends of rods 30 secured in the frame of the trough and projecting vertically therefrom. When the bottom of the trough is in its raised or closed position, the springs 26 are compressed, as shown in Fig. 2, by having their caps 28 forced against the nuts 29 on rods 30. Upon release of hydraulic pressure in cylinders 24, the springs aid the force of gravity in causing the bottom to drop down to open position as shown in dotted lines in Fig. 3. When the bottom has descended to that position, the rotation of the mixing blades 7 in opposite directions, as shown in Fig. 3, causes the contents of the trough to be speedily ejected out of the bottom opening in the trough into a chute leading to or directly into a receptacle located below the trough. The mixing blades 7 are rotated in the directions indicated by the arrows in Fig. 3, and it will be seen that the knife-like edges of the angular surfaces 13 which normally form a seat for the movable bottom, act, when the bottom is in its lowered position, as scrapers to cause any of the material carried around by the blades 7 to be scraped off and dropped out of the bottom opening of the trough.

In machines of this character it is often necessary or desirable to heat or cool the contents of the trough during the mixing or other operation, and to permit of such heating or cooling, the movable bottom thereof is accordingly made hollow, as clearly shown at 31 in Figs. 1 and 3. A heating or cooling fluid is circulated through this hollow interior of the bottom by means of the system of piping shown in Fig. 1. There, 32 indicates a vertically extending pipe leading from a source of heating or cooling fluid and connected by elbow 33 to a horizontal pipe 34 extending through the hollow interior of the bottom 9 and terminating at one of its ends, where pipe 34 is provided with outlet openings 35. A heating or cooling fluid delivered through pipe 32 passes out through the openings 35 to the interior of the bottom 9 wherein it circulates and then passes out through pipe 36, connected to a vertically connected pipe 37, surrounding and enclosing the pipe 32. The system of piping described is vertically movable with the cover, the concentrically arranged pipes 32 and 37 extending through guide 38 and being vertically movable therethrough.

In the embodiment of the invention shown in Fig. 4 a vertical type of mixing or similar machine is shown having a jacketed trough or container 50 provided with a suitable cover 51 carrying a bearing 52 through which a vertical shaft 53 extends. Said shaft 53 is rotated by a suitable gear mechanism contained in casing 54 into which drive shaft 55 projects, said shaft rotating in bearing 56 and carrying pulley 57, driven by any suitable source of power. Shaft 53 carries, near its lower end, a mixing blade 58, and the bottom of the trough 50 is closed by a movable bottom member 59 which is raised and lowered, and when in its raised or closed position, has its peripheral edge 60 held against the angular seat 61, provided on the lower end of trough 50. The bottom member 59 may be raised and lowered by any suitable mechanism and for this purpose I provide several radially extending arms 62, each having its outer end secured at the lower end of a vertically disposed shaft 63, movable through guides 64, secured on the outside of trough 50 and guides 75. The upper end of each of the shafts 63 is threaded, as shown at 65, and this threaded portion receives a nut 66 which is externally toothed as indicated at 67, the toothed portion receiving a link belt 68, or other means for rotating nut 66 to cause it to raise and lower shaft 63.

In the preferred embodiment, three or more arms 62 are employed, each carrying a vertical shaft 63 and link belt 68 engages the three toothed nuts 66, so that by movement of the belt 68, a simultaneous raising or lowering of the three shafts 63 is had. A ball bearing 69 interposed between the upper face of guide 64 and the nut 66 provides easy rotative movement of nut 66. The lower end of shaft 53 extends into the bottom member 59 and is received in bushing 70 and covered by cap 71. A ball bearing 72 is employed to permit smooth rotation of shaft 53 in bottom 59.

Through the arrangement disclosed in Fig. 4 it will be apparent that by lowering movement of the shafts 63, the bottom 59 may be caused to descend to a required extent to permit the contents of the trough to be ejected as the mixing blade 58 is rotated. Shaft 53 and mixing blade 58 mounted thereon descends with the bottom 59 and during the descent, the rotating blade 58 forces the contents of the trough rapidly out of the open bottom.

With the several embodiments shown, it will be seen that the bottoms of the troughs are opened and closed by direct vertical movement similar to that of a poppet valve so that in its open position, the movable bottom is uniformly spaced from the trough opening and no abrasive or frictional action of the bottom is had relative to its seat. By the provision of smooth, polished surfaces on the co-acting seat portions of the bottoms and troughs, it will be clear that a very firm and secure seating of the bottoms is had, so that leakage out of the troughs is effectively prevented. The provision of effective seating for the bottoms on the troughs without abrasive action prevents wear and leakage so that the life of these parts is materially increased. Since the bottoms of the troughs are movable uniformly away from their seats, the clogging of the trough at any one point around the periphery of the bottom by the building-up of material thereat, is always prevented and the entire contents of the trough can be speedily delivered by rotation of the mixing blades when the bottom is in open position.

While I have specifically described the delivery bottoms of these troughs for use in conjunction with mixing machines, it will be obvious that they can be employed in connection with other types of machines such as agitating, shredding, pulverizing, or the like without departing from the spirit of this invention.

Therefore, when I refer herein to a "mixing chamber" I wish to be understood as meaning any chamber, trough, tank or receptacle in which any material is mixed, agitated, shredded, pulverized or otherwise treated, and particularly by rotary blades or the like.

What I claim is:

1. In a machine of the character described, a mixing chamber having a bottom opening through which the contents of the chamber are ejected, a movable bottom member normally closing said opening, vertical shafts upon which said bottom member is suspended, hydraulic means for exerting an upward lift on said shafts to hold the bottom closed, and spring means for aiding in the descent or opening movement of the bottom member upon release of hydraulic uplift on the vertical shafts.

2. In a machine of the character described, a mixing chamber having a bottom opening through which the contents of the chamber are ejected, a movable bottom member covering the opening, upright shafts extending from the bottom member, a cross-head carried by each of said shafts, hydraulic means operative against the cross-head to hold the bottom member raised and in closed position over the opening, guide rods extending through the cross-head, springs seated on the cross-head and surrounding the rods, caps carried by the springs, and stops on the rods against which the caps abut to compress the springs when the cross-head is elevated and the bottom member is in its closed position.

3. In a machine of the character described, a mixing chamber, a vertical shaft located therein, mixing blades secured on said shaft, a seat surrounding the bottom edge of the chamber, a bottom member resting against said seat, means for uniformly moving the bottom member away from the seat, and a mounting for the shaft permitting the shaft and mixing blades carried thereby to be moved with the bottom member to and from the seat on the chamber.

4. In a machine of the character described, a mixing chamber having a shaft extending vertically through it, said shaft being rotated and also movable axially through the chamber, a bottom member attached at one end of the shaft, a mixing blade secured on the shaft and overlying one face of the bottom member, a seat formed at the bottom of the chamber defining an opening through which the contents of the chamber are ejected, and means for bodily moving the bottom member and the shaft and mixing blades to and from the seat.

5. In a machine of the character described, a mixing chamber having an open lower end, an angularly disposed seat surrounding said open end, a bottom member mounted for bodily movement to and from the seat, guide means for said bottom member, a drive shaft supported at one end by the bottom member, and a mixing blade carried by the shaft, said shaft and blade being movable axially with the bottom member.

6. In a machine of the character described, a mixing chamber having a discharge opening in its bottom, rotary mixing means in said chamber, a closure member movable vertically to open and closed positions, means for guiding said member in its vertical movement, an angular seating surface surrounding the discharge opening, and an angular co-operating seat on the edge of the closure member for abutment against the seating surface when the closure member is in closed position, said angular seating surface being provided with a knife-like edge to strip material from the mixing means during rotation thereof while the closure member is open and cause the said material to be directed through the discharge opening.

7. In a machine of the character described, a mixing chamber, mixing means located therein, said chamber having a discharge opening in its bottom, a seating surface surrounding said opening, a closure member for seating against said seating surface and closing said opening, a knife-like edge surrounding the opening for stripping mixture from the mixing means when the closure member is in open position, and means for directly raising and lowering the closure member.

8. In a machine of the character described, a mixing chamber, mixing means located therein, said chamber having a discharge opening at its bottom, an inclined seating surface surrounding said opening, a closure member for seating against said seating surface and closing the opening, the closure member having an inclined surface complementary to that of the seating surface, means for bringing the two angular surfaces together to seat the closure member without causing scraping action of said surfaces, said closure member when seated having its inner face meeting the inner surface of the chamber about the opening to form an interrupted continuation of said surface.

EVARTS G. LOOMIS.